United States Patent
Higdon et al.

[11] Patent Number: 5,874,889
[45] Date of Patent: Feb. 23, 1999

[54] SYSTEM AND METHODS FOR TRIGGERING AND TRANSMITTING VEHICLE ALARMS TO A CENTRAL MONITORING STATION

[75] Inventors: Ray Higdon, Atlanta; Matt Borbi, Duluth; Jeffrey Hamburg, Alpharetta, all of Ga.

[73] Assignee: Roadtrac LLC, Roswell, Ga.

[21] Appl. No.: 866,684

[22] Filed: May 30, 1997

Related U.S. Application Data

[60] Provisional application No. 60/035,173, Jan. 9, 1997.

[51] Int. Cl.[6] .................................................. B60R 25/10
[52] U.S. Cl. ......................... 340/426; 340/428; 340/430; 340/539; 307/10.2; 307/10.3
[58] Field of Search ................................ 340/425.5, 426, 340/428, 429, 430, 989, 991, 993, 825.31, 825.32; 307/10.2, 10.3, 10.4, 10.5, 10.6; 180/287

[56] References Cited

U.S. PATENT DOCUMENTS

| | | | |
|---|---|---|---|
| 4,262,279 | 4/1981 | Dublirer | 340/430 |
| 4,463,340 | 7/1984 | Adkins et al. | 340/428 |
| 4,887,064 | 12/1989 | Drori et al. | 340/426 |
| 4,891,650 | 1/1990 | Sheffer | 342/457 |
| 4,990,890 | 2/1991 | Newby | 340/539 |
| 5,014,206 | 5/1991 | Scribner et al. | 364/449 |
| 5,032,845 | 7/1991 | Velasco | 342/457 |
| 5,043,736 | 8/1991 | Darnell et al. | 342/357 |
| 5,086,288 | 2/1992 | Stramer | 340/426 |
| 5,103,459 | 4/1992 | Gilhousen et al. | 375/1 |
| 5,223,844 | 6/1993 | Mansell et al. | 342/357 |
| 5,247,564 | 9/1993 | Zicker | 340/426 |
| 5,276,728 | 1/1994 | Pagliaroli et al. | 340/426 |
| 5,278,547 | 1/1994 | Suman et al. | 340/426 |
| 5,396,216 | 3/1995 | Morgan | 340/426 |
| 5,467,070 | 11/1995 | Drori et al. | 340/426 |
| 5,515,043 | 5/1996 | Berard et al. | 340/426 |
| 5,515,419 | 5/1996 | Sheffer | 340/539 |
| 5,519,376 | 5/1996 | Iijima | 340/426 |
| 5,557,254 | 9/1996 | Johnson et al. | 340/426 |
| 5,606,307 | 2/1997 | Kuan | 340/428 |
| 5,677,664 | 10/1997 | Sawinski | 340/430 |
| 5,684,454 | 11/1997 | Nishioka et al. | 340/426 |
| 5,686,883 | 11/1997 | Mutoh et al. | 340/426 |

*Primary Examiner*—Thomas J. Mullen, Jr.
*Assistant Examiner*—Van T. Trieu
*Attorney, Agent, or Firm*—Needle & Rosenberg, P.C.

[57] ABSTRACT

A vehicle security system and methods for triggering alarms, including a controller responsive to entry of a security code via the keypad which matches a particular security code to disengage an starter blocking relay. The controller is further responsive to determining that the ignition switch is turned to the "on" position without prior entry of a matching security code to start a timer which times out after a predetermined period of time, whereby in response to non-entry of a matching security code before expiration of the predetermined period of time, the controller generates an alarm signal for transmission via the wireless transceiver to a central monitoring station. If the controller determines that the ignition switch is turned to its off position after the timer is started, it disengages the starter blocking relay so as to enable ignition of the vehicle. Consequently, an attacker will believe he has successfully started the ignition of the car, while the central monitoring station will have been alerted of the intrusion and notified the police authorities.

13 Claims, 6 Drawing Sheets

SYSTEM AND METHODS FOR TRIGGERING AND TRANSMITTING VEHICLE ALARMS TO A CENTRAL MONITORING STATION

This application claims the benefit of provisional application Ser. No. 60/035,173 filed Jan. 9, 1997.

BACKGROUND OF THE INVENTION

The present invention is directed to a vehicle security system, and more particularly to a vehicle security system having the ability to transmit an alarm signal to a central monitoring station without alerting intruders.

Vehicle security systems are useful in preventing theft of vehicles, and in some cases in bringing to justice the criminals who steal vehicles. However, most vehicle security systems lack the capability of protecting the vehicle owner and passenger from harm in the event they are present at the vehicle during a theft. This situation is commonly called a "car-jacking". In particular, the owner of a vehicle faces a potentially life-threatening situation when he/she has just entered the vehicle and has not yet started the ignition when an attacker approaches. The attacker may either oust the owner from the driver's seat, steal the owner's keys and drive away with the vehicle, or may force the owner to stay in the vehicle and drive away under threat of serious bodily harm.

It is desirable to provide a vehicle security system which is capable of detecting when a vehicle is being "car-jacked" in such a way so as not to alert the attacker, but to alert police authorities who can attempt to rescue the vehicle owner and passengers from the attacker.

SUMMARY OF THE INVENTION

Briefly, the present invention is directed to a vehicle security system, and more specifically to a system and methods for triggering alarms in a vehicle security system without alerting an attacker or thief, and thus prevent potential harm to the driver of a vehicle. The vehicle security system according to the present invention comprises, among other components, an ignition switch sensor for detecting when an ignition switch of a vehicle is turned to on and off positions, a keypad having buttons for entering alphanumeric data, and an start blocking relay suitable for connection to an ignition switch of a vehicle for enabling and disabling ignition of an engine of a vehicle. A controller for controlling the vehicle security system is coupled to the ignition switch sensor, to the starter blocking relay, to the keypad, to the memory and to a wireless transceiver, such as a cellular telephone. The controller is responsive to entry of a security code via the keypad which matches the particular security code to disengage the starter blocking relay. The controller is further responsive to determining that the ignition switch is turned to the "on" position without prior entry of a matching security code to start a timer which times out after a predetermined period of time, whereby in response to non-entry of a matching security code before expiration of the predetermined period of time, the a controller generates an alarm signal for transmission via the wireless transceiver to a central monitoring station. The controller is further responsive to determining that the ignition switch is turned to the off position after the timer is started to disengage the starter blocking relay so as to enable ignition of the vehicle. Consequently, an attacker will believe he has successfully started the ignition of the car, while the central monitoring station will have been alerted of the intrusion and notified the police authorities. If the owner of the vehicle is in the driver's seat, then the alarm signal can be generated in the manner described without alerting the attacker, and thus possibly prevent the attacker from harming the owner.

The vehicle security system further includes a global positioning system (GPS) receiver that periodically generates a position signal. The controller of the vehicle security system will transmit a location information signal to the central monitoring station in order to advise the police authorities of the location of the vehicle.

A handheld remote transmitter is carried by the user, and is capable of transmitting a panic alarm signal to trigger the vehicle security system to generate alarms, and to cause the transmission of an alarm signal to the central monitoring station (with or without audible and visual alarms at the vehicle itself).

The above and other objects and advantages of the present invention will become more readily apparent when reference is made to the following description, taken in conjunction with the accompanying drawings.

DETAILED DESCRIPTION OF THE DRAWINGS

Figure 1:
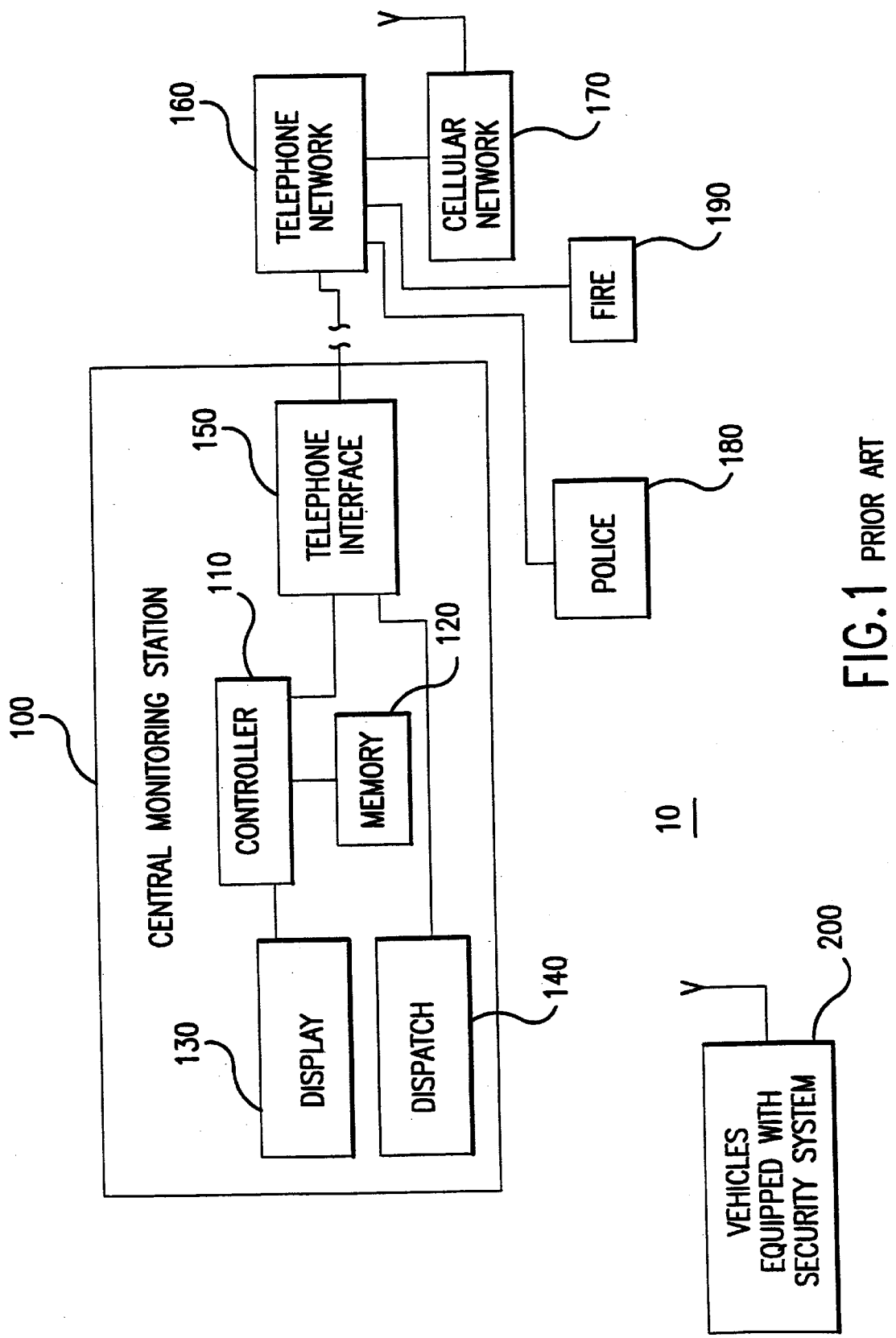
FIG. 1 is a block diagram of a monitoring system for vehicles comprising a central monitoring station and a plurality of vehicles each having a vehicle security system capable of wirelessly communicating with the central monitoring station.

Referring first to FIG. 1, a vehicle security monitoring system (hereinafter "monitoring system") is shown. The monitoring system 10 comprises a central monitoring station 100 and a plurality of vehicles equipped with vehicle security systems (only one is shown for simplicity). The present invention is directed to advancements in the vehicle security system shown at 200, and methods for triggering alarm signals for transmission from the vehicle security system to the central monitoring station 100.

The central monitoring station 100 receives alarm signals transmitted from the vehicle security systems 200 in order to notify authorities of alarms and advise of the location of the vehicles. To this end, the central monitoring station includes a controller 110, a memory 120, a display 130, a dispatch 140, and a telephone interface 150. The controller 110 controls the overall operation of the central monitoring station 100. The controller 110 is a computer, such as a desktop computer or server computer and is controlled by a software program stored in memory 120. Information concerning the status of alarms, location of vehicles, etc., is displayed on the display 130. Data is also stored in memory 120, including information such as police locations, police telephone numbers, vehicle identification numbers for the vehicle security systems 200 in the system 10, vehicle descriptions, etc.

Communication with vehicles in the system is preferably by cellular telephone link. The telephone interface 150 provides telephonic connection via a public telephone network 160 and cellular telephone network 170. The telephone interface 150 also includes modem capabilities for transmitting and receiving data. In addition, the central monitoring station 100 communicates with police authorities 180 and fire authorities 190 also through the telephone network 160. A vehicle owner who has a vehicle security system 200 subscribes for monitoring service from the central monitoring station 100, for a monthly or yearly fee, for example.

Figure 2:
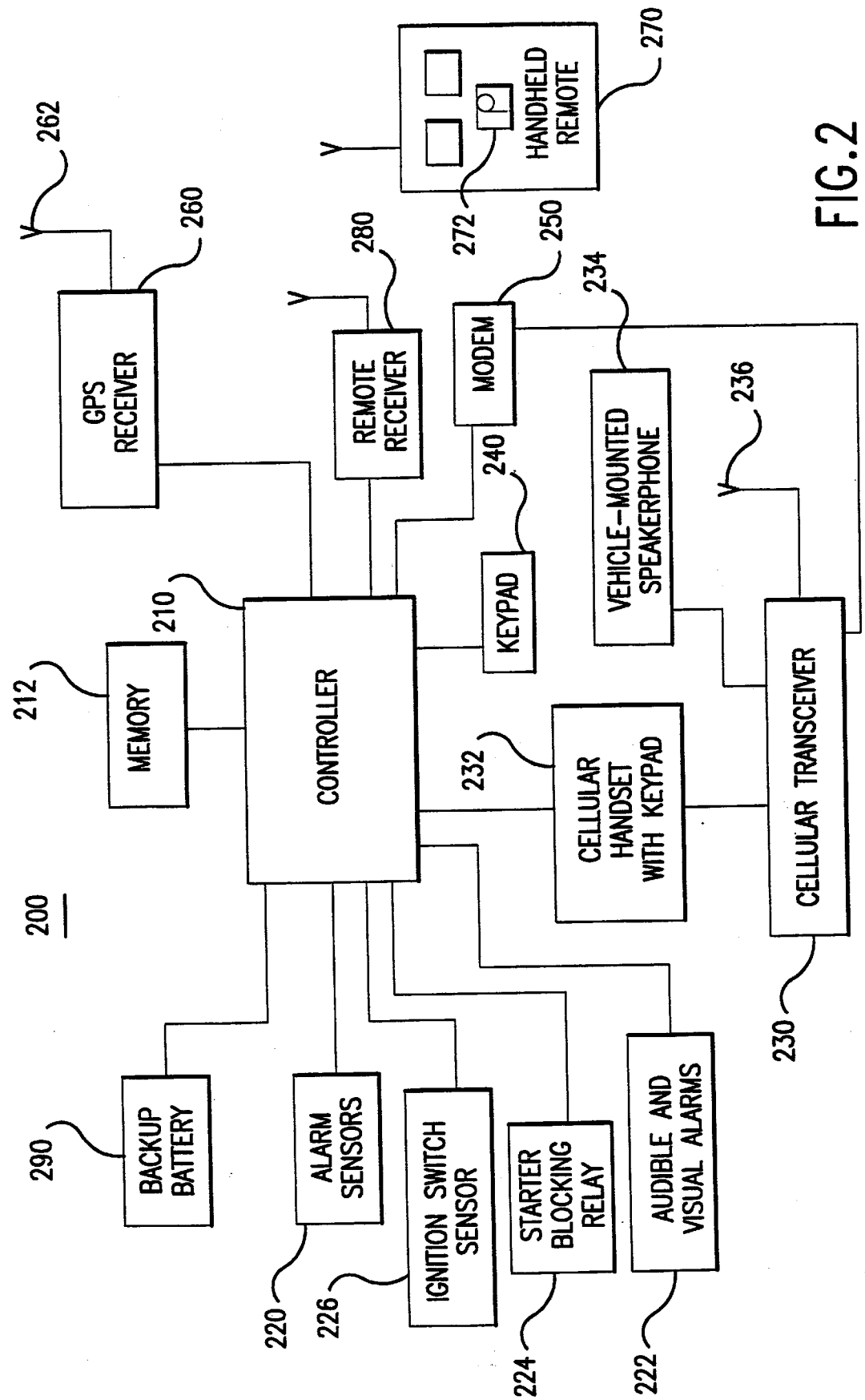
FIG. 2 is a block diagram of a vehicle security system according to the present invention.

Turning now to FIG. 2, the vehicle security system 200 will be described. The control point of the vehicle security system 200 is a controller 210. The controller 210 controls the vehicle security system through a software program which is stored in memory 212 or in an internal memory to the controller 210. The controller is preferably a microprocessor device, such as those manufactured by Motorola, Inc., Intel Corporation or other microprocessor manufacturers. The microprocessor and memory 212 may be incorporated in a single integrated circuit chip. Alternatively, the controller 210 is a specially designed hardware circuit that handles the control functions of the vehicle security system 200. In either case, the controller 210 collects information concerning the status of various components in the vehicle security system and supplies control signals to the components (via appropriate digital-to-analog conversion circuitry in the case of a microprocessor-based controller).

A plurality of alarm sensors 220 are mounted in various locations throughout the vehicle, such as doors, trunk, windows, etc. Audible and visual alarms 222 are provided and are triggered by the controller 210 in response to certain security breaches of the system. In addition, the ignition of the vehicle is controlled by an starter blocking relay 224. The starter blocking relay 224 is a controllable switch or circuit that is connected to the starter motor of the vehicle to inhibit and allow actuation of the starter motor. The starter blocking relay 224 inhibits the starter motor and thus ignition of the vehicle when engaged, and allows ignition when disengaged. An ignition switch sensor 226 is provided to detect the positions of the ignition switch of a vehicle, and is important to the alarm triggering process to be described hereinafter. The interconnection of the starter blocking relay 224 and ignition switch sensor 226 in the electrical system of a vehicle will be described hereinafter with reference to FIG. 3.

The vehicle security system 200 communicates with the central monitoring station 100 via a cellular telephone link. To this end, the vehicle security system 200 includes a cellular telephone (either installed as part of the system or incorporated into the system if already installed in the vehicle) comprising a cellular transceiver 230, cellular handset with keypad 232, an optional vehicle-mounted speakerphone 234 (mounted microphone and speaker) to allow for hands-free use of the cellular telephone, and an antenna 236. Voice communication by a passenger in the vehicle may be made by the cellular handset 232 or the vehicle-mounted speakerphone 234. Entry of alphanumeric information into the vehicle security system by a user is made via the keypad on the cellular handset 232 or via a separate keypad 240.

A modem 250 is provided to enable one-way or two-way communication of data between the central monitoring station 100 and the vehicle security system 200, again by cellular telephone link. For example, control signals from the central monitoring station 100 are transmitted to the vehicle security system 200 from time to time. In addition, alarm signals and other data is transmitted from the vehicle security system 200 to the central monitoring station 100 via the modem 250 and cellular transceiver 230, as will be described hereinafter. The functions of the modem 250 may be incorporated on a single circuit board that also includes the controller 210 and memory 212.

The vehicle security system 200 includes a GPS receiver 260 and antenna 262 to receive satellite transmitted GPS signals and generate position signals representing the current location of the vehicle. These position signals may be in the form of latitude/longitude information and are coupled to the controller 210.

Remote control of the vehicle security system 200 is provided by a handheld remote device 270. The remote device 270 comprises several buttons and activates and de-activates the vehicle security system by transmitting coded signals which are received by the remote receiver 280. In addition, the remote device 270 comprises a panic button 272 to transmit a panic alarm triggering signal to the controller 210.

Security codes may be assigned by users to the system 200 to allow various levels of access to the vehicle. An ignition security code is assigned to enable only those with knowledge of the code to start the vehicle by entering the ignition security code on the keypad 240 or the keypad of the cellular handset 232. The security codes are stored in the memory 212 and are used by the controller for comparison with entered security codes in order to allow authorized access to the system 200.

Power to the vehicle security system is provided primarily by the battery of the vehicle. However, backup power is provided by a backup battery 290. Though backup battery 290 is shown connected only to the controller 210, it is to be understood that it is coupled through appropriate voltage regulation circuits to all of the various circuits in the vehicle security system which require power.

The functions and features of the vehicle security system 200 are defined largely by a software program stored in the memory 212. The software program includes modules or segments to control the cellular telephone to automatically dial telephone numbers, particularly an access telephone number of the central monitoring station 100. There are also software modules to control the activation of the audible and visual alarms, to control the modem 250, to periodically generate updated location information based on the GPS signals received by the GPS receiver for transmission to the central monitoring station 100, as well as to perform the alarm triggering procedures according to the present invention.

Figure 3:
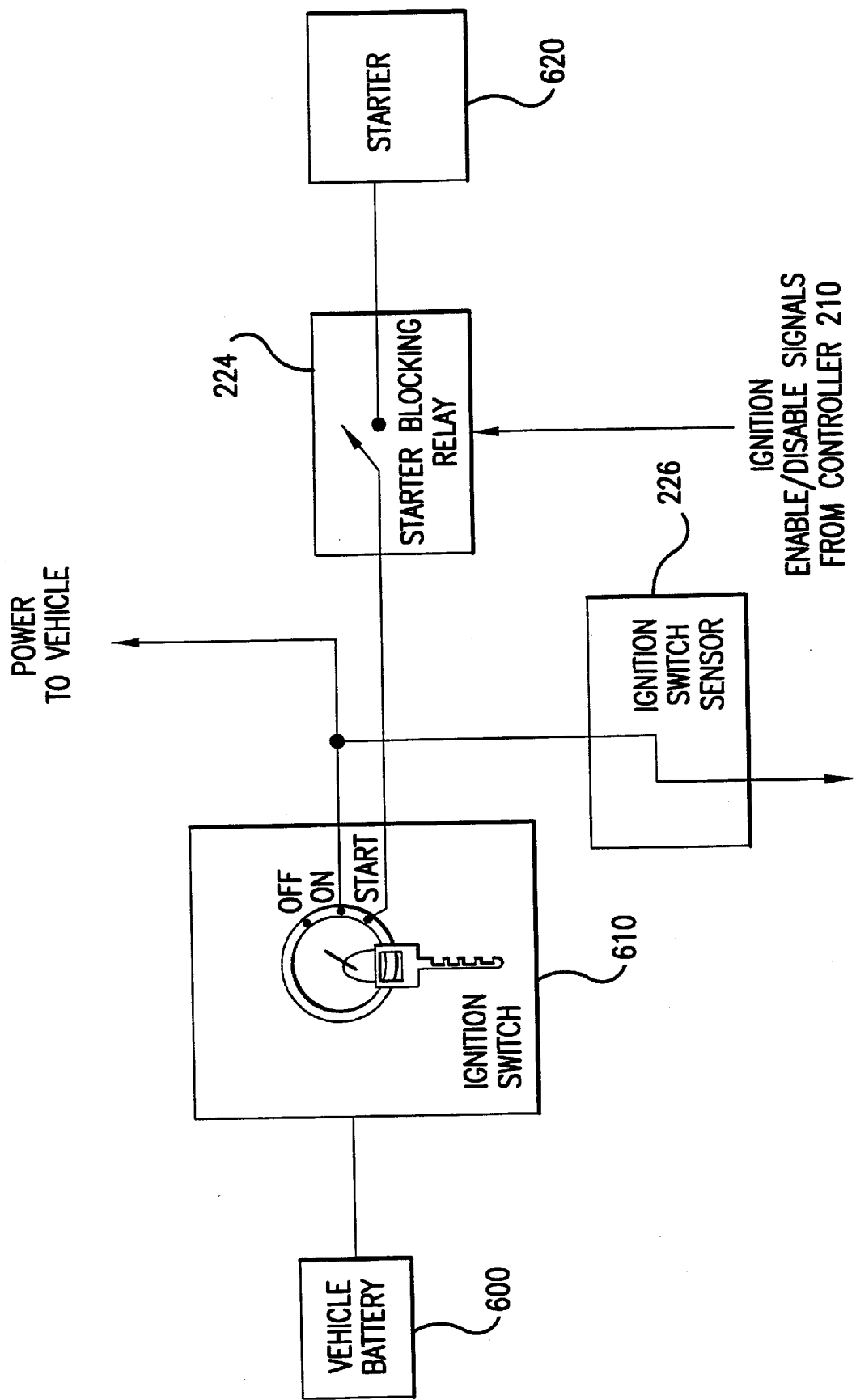
FIG. 3 is a diagram showing interconnection of an ignition switch sensor and starter blocking relay in the electrical system of a vehicle in accordance with the present invention.

Turning to FIG. 3, there is illustrated a vehicle battery 600, ignition switch 610 and starter 620 of a vehicle electrical system. The ignition switch 610 has three positions, "on", "off" and "start" as is well known in the art. The starter blocking relay 224 is an electronically controllable switch connected between the "start" position of the ignition switch and the starter 620. The ignition switch sensor 226 is an electrical wire connection to the "on" position of the ignition switch 610 or to the wire connected to the "on" position of the ignition switch 610. The vehicle systems (radio, air conditioning, headlights, windows, etc.) are powered when the ignition switch is in the "on" position, as is known in the art. When the ignition switch is in the "on" position, the ignition switch sensor will detect the voltage of the vehicle battery 600. This information is coupled to the controller 210 for processing as described below. The starter blocking relay 224 will close, completing the circuit between the "on" position of the ignition switch 610 and the starter 620 in response to an ignition enable signal (starter blocking relay is disengaged), and will open, disconnecting the starter 620 from the "on" position of the ignition switch 610 in response to an ignition disable signal (starter blocking relay engaged).

Figure 4:
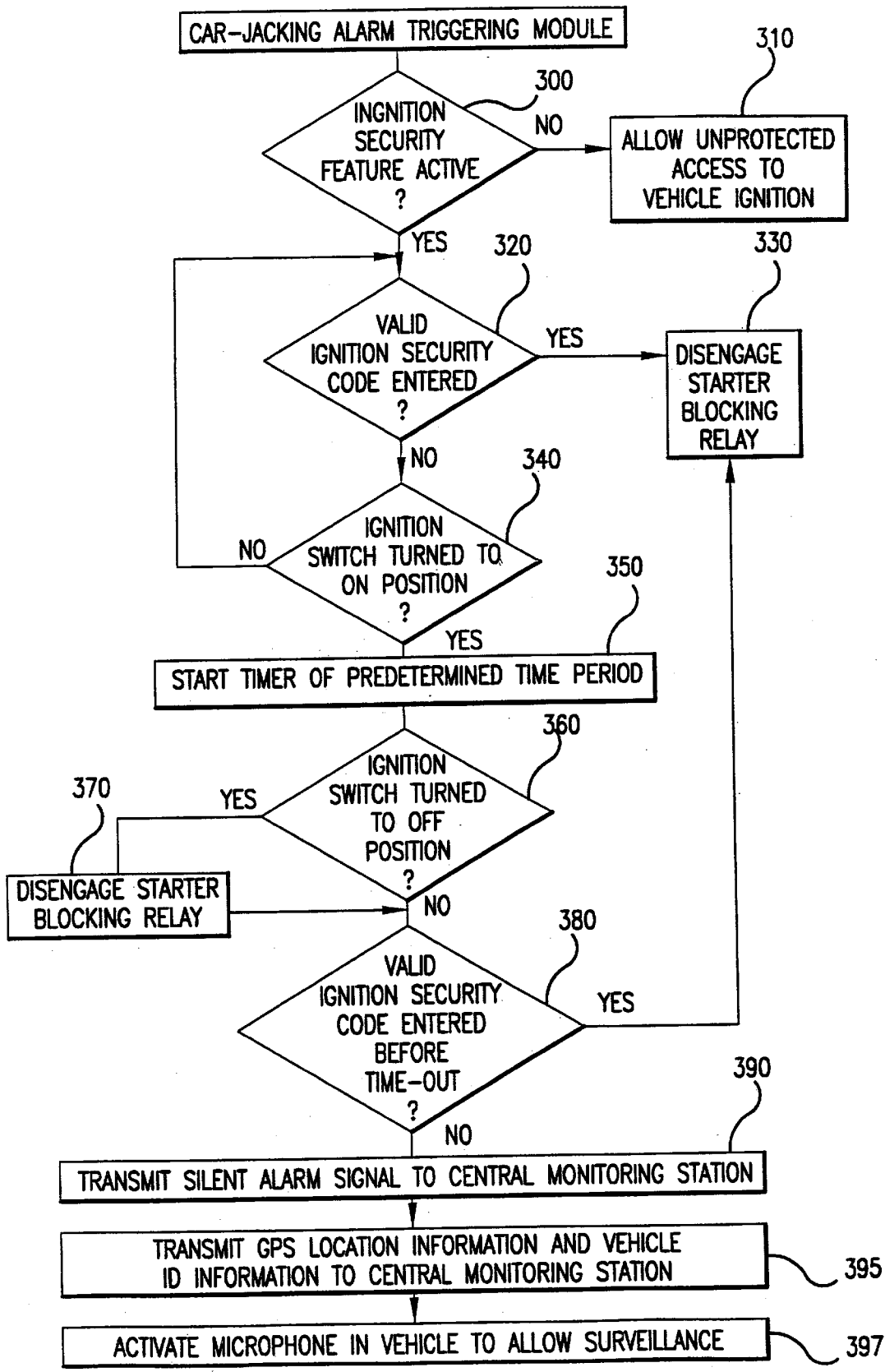
FIG. 4 is a flow diagram showing an alarm triggering process specifically designed for a car-jacking situation, according to the present invention.

FIG. 4 is a flow chart representing the functionality of the car-jacking ear alarm triggering procedure, also referred to as the silent alarm triggering procedure. Reference is also made to FIG. 3 for the corresponding positions of the ignition switch 610. In step 300, it is determined whether the ignition security feature of the vehicle security system is active. This is the feature which allows for triggering of an alarm signal in response to detecting conditions consistent with the occurrence of a car-jacking, or other theft. If active, this means that the controller 210 has already generated an ignition disable signal causing the starter blocking relay 224 to engage (open) so that the vehicle ignition cannot be turned on without entry of a predetermined ignition security code. In step 300, a determination that the ignition security feature is not active means that the starter blocking relay 224 is disengaged (closed), allowing uninhibited access to the ignition of the vehicle as represented by step 310. If the ignition security feature is determined to be active, then in step 320, it is determined whether a valid ignition security code is entered. Security codes are entered via the keypad 240 or the keypad of the cellular handset 232. In step 320, the ignition security code that is entered is compared with a predetermined ignition security code stored in the memory 212. If there is a match between the entered ignition security code and the stored predetermined ignition security code, then the controller 210 generates an ignition enable signal causing the starter blocking relay 224 to disengage (close) in step 330 to permit the vehicle ignition to be started by turning the ignition switch to the "start" position. If a matching (valid) ignition code is not entered in step 320, then the process proceeds to step 340. In step 340, if the ignition switch sensor 226 senses voltage on the "on" position of the ignition switch 610 indicating that the ignition switch is turned to its "on" position in step 340 (without prior entry of a matching ignition security code in step 320), a (software) timer is started in step 350 which will time-out after a predetermined period of time. The predetermined period of time of the timer begins when the ignition switch 610 is turned to its "on" position, and is, for example, 20 seconds (though it may be user-programmable).

In step 360, it is determined whether the ignition switch is turned to its "off" position indicated by the ignition switch sensor 226 sensing zero voltage on the "on" position of the ignition switch 610. If the controller 210 determines that the ignition switch 610 is turned to the "off" position, then in step 370 the controller 210 generates an ignition enable signal which closes (disengages) the starter blocking relay 224 to permit the vehicle to be started. Whether the ignition switch 610 is turned to the "off" position or not, in step 380, it is determined whether a valid ignition security code is entered before expiration of the predetermined period of time. If a valid ignition security code is timely entered in step 380, then the starter blocking relay 224 is disengaged in step 330 and the vehicle may be started by turning the ignition switch 610 to the "start" position. The controller 210 is programmed such that after the timer is started in step 350, at any time the ignition switch sensor 224 detects that the ignition switch 610 is turned to its "off" position, the controller 210 will issue an ignition enable signal to disengage the starter blocking relay 224, even if it is ultimately determined in step 380 that a valid ignition security code is not timely entered. This will protect against an attacker becoming suspicious that the vehicle may have a security system.

If a valid ignition security code is not timely entered in step 380, then in step 390, an alarm signal is generated by the controller 210, the telephone number of the central monitoring station is automatically dialed and an alarm signal is transmitted via the cellular transceiver 230 and modem 250 to the central monitoring station 100. This alarm signal is "silent" insofar as it is not accompanied by any audible or visual alarms, or any other alarm indication in the vehicle that would alert a "carjacker". The vehicle ignition may have previously been enabled in step 370 if the ignition switch is turned to the off position, though once the timer expires the alarm signal is ultimately transmitted in step 390. Once enabled in step 370, the ignition will stay enabled so that an attacker does not suspect an alarm has been generated if he attempts to start the ignition at this point in the process.

It is envisioned that the alarm signal generated by the process shown in FIG. 4 would be tagged with header information or otherwise identified as one that was triggered by the silent or car-jacking alarm triggering module, so as to distinguish it from other alarm signals that may be transmitted to the central monitoring station 100. In addition, in step 395, the controller generates a GPS location information signal based on a position signal generated by the GPS receiver 260. The GPS location information signal is transmitted together with vehicle identification information to the central monitoring station 100. It should be understood by those with ordinary skill in the art, that the signals referred to in steps 390 and 395 may be transmitted at the same time in one digital packet of information to the central monitoring station 100, or in separate packets of information. The GPS location information signal may be periodically transmitted to the central monitoring station 100 to update the current position of the vehicle, as it may change if the vehicle is driven. As a further feature, the controller 210 may cause the vehicle mounted speakerphone 234 to go active and allow transmission of voices and/or sounds via cellular telephone link to the central monitoring station, without the attacker knowing.

Figure 5:
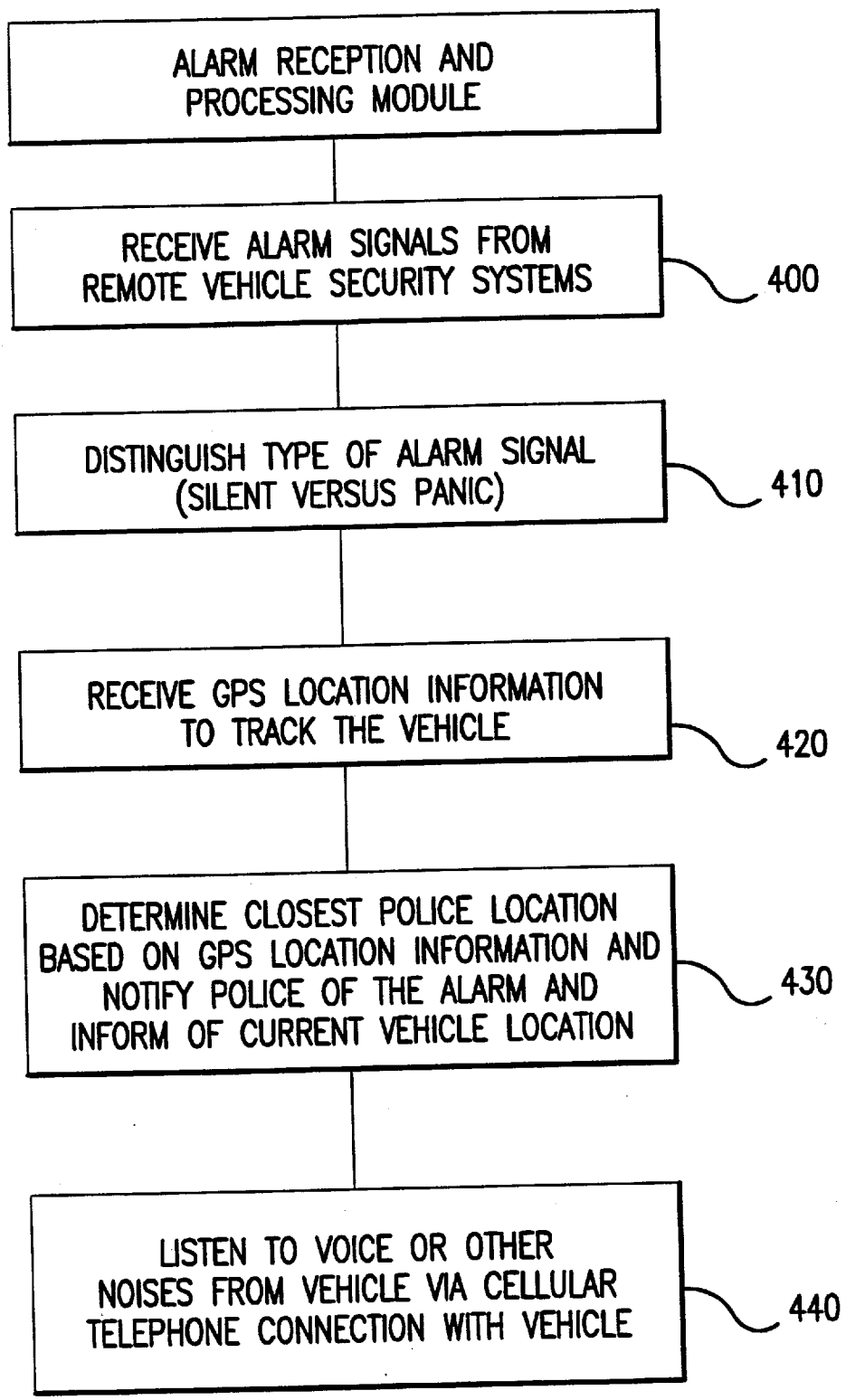
FIG. 5 is a flow diagram showing how alarm signals are received from vehicle security systems and processed by a central monitoring station.

FIG. 5 illustrates how the central monitoring station 100 processes incoming alarm signals from vehicle security systems 200. Step 400 represents the reception via the telephone interface 150 of alarm signals from remote vehicle security systems 200. In step 410, the controller 110 distinguishes between the type of alarm signals received, such as silent (car-jacking) versus panic, or other alarm signals. In step 420, the GPS location information signal is received to track the location of the vehicle as well as the identification of the vehicle security system that transmitted the alarm signal. Again, the alarm signal, GPS location information and vehicle identification may be received in one digital data packet by the central monitoring station. In step 430, the controller accesses a database in memory 120 to determine the closest police location to the vehicle that has transmitted an alarm signal, and notifies the police authorities about the car-jacking alarm, together with the location of the vehicle and its physical description. As an optional surveillance tactic, the central monitoring system 100 may "listen-in" to the vehicle via the vehicle-mounted speakerphone 234 over an open cellular telephone connection, allowing persons at the central monitoring station to assess the seriousness of the situation.

The car-jacking alarm triggering feature addresses the concern of protecting persons who are faced with a "car-jacking" situation. In the event a person is confronted by a "car-jacker", the driver of the car simply turns the ignition on, without first entering the ignition code. The timer will start, allowing a driver to enter the ignition security code (in the event of a mistake), but once the timer expires without entry of a valid ignition security code, an alarm signal is generated and transmitted by cellular telephone link to the central monitoring station 100. Thus, the police authorities will be alerted, but no alarm (audible or visual) is made at the vehicle which would alert the attacker. The ignition will be enabled once the ignition switch is turned to the "off" position, so that the vehicle ignition will start when the ignition switch is moved forward to the "start" position. With the attacker present, the owner of the vehicle can perform these simple steps (without entering the ignition security code) in order to trigger the transmission of the silent alarm signal without being detected by the attacker. This is a much safer alternative to a more conspicuous action of hitting a "panic" button in the vehicle, for example, in order to trigger an alarm.

On the other hand, if the attacker takes the driver's seat from the owner and attempts to start the vehicle without entering the ignition security code, then the sequence of events described above will naturally occur. That is, the attacker will attempt to start the vehicle without entering the ignition security code in step 340 of FIG. 4 (the attacker will have no knowledge that such a code must be entered first) and the ignition will be disengaged by virtue of the starter blocking relay. The first start attempt will cause the timer to start in step 350 of FIG. 4. The attacker will naturally turn the ignition switch back to the "off" position (disengaging the starter blocking relay by way of steps 360 and 370 of FIG. 4) and then back to the "on" position and then the "start" position in a second attempt to start the vehicle. This time, the vehicle will be allowed to start, but the alarm signal will have been transmitted without the attacker knowing it because a valid ignition security code was never entered before the timer timed-out in step 380 of FIG. 4.

Figure 6:
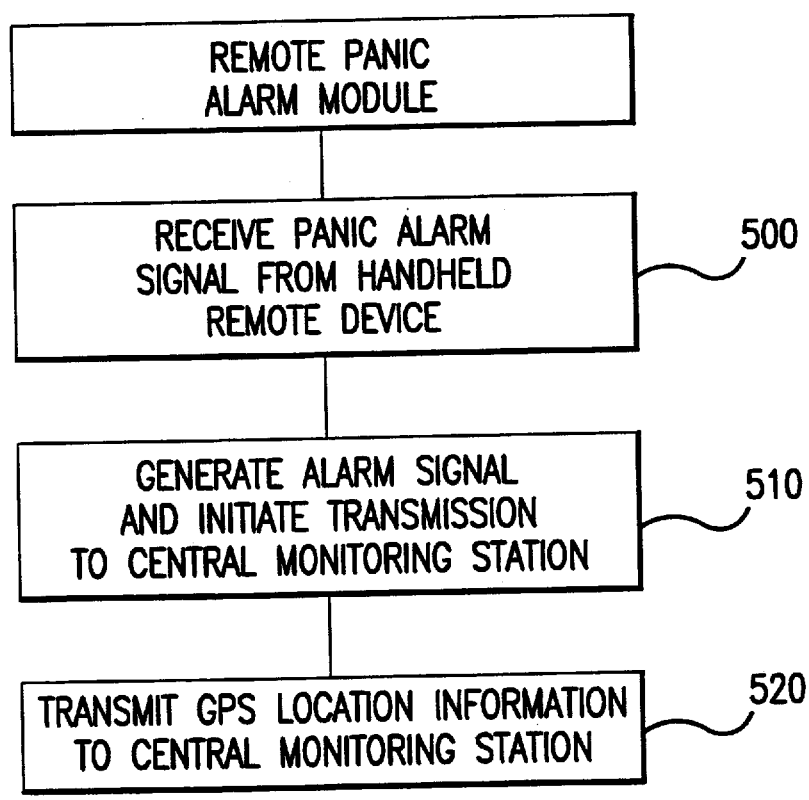
FIG. 6 is a flow diagram showing a remote panic alarm triggering process of the vehicle security system.

FIG. 6 illustrates the flow process of the remote panic alarm feature. In step 500, the panic button 272 on the handheld remote 270 is depressed, causing a panic alarm signal to be transmitted to the controller 210 of the vehicle security system. The remote receiver 280 receives the panic alarm signal and couples it to the controller 210. The controller 210, in step 510, will generate an alarm signal and cause it to be transmitted to the central monitoring station 100. The panic alarm signal may also cause the audible and visual alarms 222 to be activated, or the system can be programmed so that they are not activated. In either event, an alarm signal is transmitted to the central monitoring station 100. In step 520, the GPS location information signal is generated and transmitted to the central monitoring station, to allow the location of the vehicle to be determined. The central monitoring station will then respond to the alarm signal. It may desirable to treat a panic alarm signal differently at the central monitoring station. Thus, the alarm signal transmitted to the central monitoring station by the process of FIG. 5 may be tagged with header information or otherwise identified as a "panic" alarm signal triggered by the handheld remote 270. The panic alarm is an alarm triggering process separate and in addition to the car-jacking alarm triggering process and other alarms of the vehicle security system.

The above invention has been described by way of example only. It will be appreciated by those with ordinary skill in the art that many modifications, additions, and deletions may be made without departing from the spirit and scope of the invention as set forth in the following claims.

We claim:
1. A vehicle security system, comprising:
an ignition switch sensor for detecting when an ignition switch of a vehicle is turned to on and off positions;
a keypad having buttons for entering alphanumeric data;
a memory for storing information including a predetermined security code;
a wireless transceiver for transmitting signals to a central monitoring station;
a starter blocking relay suitable for connection to an ignition switch of a vehicle for enabling and disabling ignition of an engine of a vehicle;
a controller for controlling the vehicle security system, the controller coupled to the ignition switch sensor, to the starter blocking relay, to the keypad, to the memory and to the wireless transceiver, the controller being responsive to entry of a security code via the keypad which matches the particular security code to disengage the starter blocking relay and thereby enable ignition of a vehicle, and responsive to the ignition switch sensor determining that the ignition switch is turned to the on position without prior entry of a matching security code to start a timer which times out after a predetermined period of time, whereby the controller is responsive to non-entry of a matching security code before expiration of the predetermined period of time to generate an alarm signal for transmission via the wireless transceiver to a central monitoring station, and is further responsive to the ignition switch sensor determining that the ignition switch is turned to the off position after the timer is started to disengage the starter blocking relay so as to enable ignition of the vehicle.

2. The vehicle security system of claim 1, and further comprising a global positioning system (GPS) receiver connected to the controller, the GPS receiver generating a signal indicating a position of the vehicle, wherein the controller is responsive to the GPS receiver for generating a location signal which is transmitted via the wireless transceiver to the central monitoring station.

3. The vehicle security system of claim 1, wherein the starter blocking relay comprises a controllable switch suitable for connection between a start position of the ignition switch of a vehicle and a starter of a vehicle, the controller generating an ignition enable signal for disengaging the starter blocking relay whereby the switch is responsive to the ignition enable signal to close and complete a circuit between a vehicle battery and the starter of the vehicle when the ignition switch is turned to the start position, and the controller generating an ignition disable signal for engaging the starter blocking relay whereby the switch is responsive to the ignition disable signal to open and disconnect the starter from the start position of the ignition switch.

4. The vehicle security system of claim 1, wherein the ignition switch sensor comprises an electrical wire connected to the on position of the ignition switch to detect a voltage thereon, wherein presence of voltage indicates that the ignition switch is turned to the on position and absence of voltage indicates that the ignition switch is turned to the off position.

5. The vehicle security system of claim 1, wherein the wireless transceiver is a cellular telephone transceiver.

6. The vehicle security system of claim 5, wherein the controller is responsive to the alarm signal to cause a cellular telephone link to be made with the central monitoring station to transmit voice and other sounds detected by a speakerphone associated with the cellular transceiver mounted within the vehicle.

7. The vehicle security system of claim 1, and further comprising a remote device having a transmitter for transmitting signals to the controller, and a remote receiver coupled to the controller for receiving signals transmitted by the remote device, wherein the remote device generates a panic alarm signal in response to actuation of a button thereon, the controller being responsive to the panic alarm signal to transmit an alarm signal via the wireless transceiver to a central monitoring station.

8. A method for triggering alarms in a vehicle security system comprising steps of:

receiving a security code and comparing it with a predetermined security code;

enabling ignition of the vehicle if the security code matches the particular security code, and if not, maintaining the ignition disabled;

detecting when an ignition switch of a vehicle has been turned to an on position prior to entry of a security code which matches the predetermined security code;

if the ignition switch of a vehicle has been turned to an on position prior to entry of a matching security code, then starting a timer which times out a predetermined period of time after detecting that the ignition switch has been turned to the on position;

enabling ignition of the vehicle if a security code which matches the predetermined security code is received within the predetermined period of time;

transmitting an alarm signal to the central monitoring station if a matching security code is not received within the predetermined period of time, detecting when the ignition switch is turned to an off position after the timer is started; and enabling ignition of the vehicle in response to detecting that the ignition switch is turned to the off position.

9. The method of claim 8, and further comprising the step of transmitting a location information signal to the central monitoring station to enable tracking of a vehicle that has transmitted an alarm signal.

10. The method of claim 8, and further comprising the step of transmitting over a cellular telephone link to the central monitoring station voices and/or sounds detected in the vehicle.

11. A method for triggering alarms in a vehicle security system comprising steps of:

receiving a security code and comparing it with a predetermined security code;

enabling ignition of the vehicle if the security code matches the particular security code, and if not, maintaining the ignition disabled;

detecting when an ignition switch of a vehicle has been turned to an on position prior to entry of a security code which matches the predetermined security code;

enabling ignition of the vehicle if a security code which matches the predetermined security code is received within a predetermined period of time after detecting that the ignition is turned to the on position;

detecting when the ignition switch is turned to an off position after the ignition switch has been turned to the on position without prior entry of a matching security code;

enabling ignition of the vehicle in response to the ignition switch being turned to the off position; and transmitting an alarm signal to the central monitoring station if a matching security code is not received within the predetermined period of time.

12. The method of claim 11, and further comprising the step of transmitting a location information signal to the central monitoring station to enable tracking of a vehicle that has transmitted an alarm signal.

13. The method of claim 11, and further comprising the step of transmitting over a cellular telephone link to the central monitoring station voices and/or sounds detected in the vehicle.

\* \* \* \* \*